United States Patent
Matsumoto

(10) Patent No.: US 11,933,201 B2
(45) Date of Patent: Mar. 19, 2024

(54) VALVE TIMING ADJUSTMENT DEVICE AND METHOD FOR MANUFACTURING VALVE TIMING ADJUSTMENT DEVICE

(71) Applicant: Mitsubishi Electric Corporation, Tokyo (JP)

(72) Inventor: Takuhiro Matsumoto, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 18/270,758

(22) PCT Filed: Mar. 16, 2021

(86) PCT No.: PCT/JP2021/010586
§ 371 (c)(1),
(2) Date: Jul. 3, 2023

(87) PCT Pub. No.: WO2022/195714
PCT Pub. Date: Sep. 22, 2022

(65) Prior Publication Data
US 2024/0052764 A1 Feb. 15, 2024

(51) Int. Cl.
*F01L 1/34* (2006.01)
*F01L 1/344* (2006.01)
*F16F 1/10* (2006.01)

(52) U.S. Cl.
CPC ... *F01L 1/3442* (2013.01); *F01L 2001/34483* (2013.01); *F16F 1/10* (2013.01); *F16F 2234/06* (2013.01); *F16F 2238/026* (2013.01)

(58) Field of Classification Search
CPC ... F01L 1/3442; F01L 1/2001; F01L 1/34483; F16F 1/10; F16F 2234/06; F16F 2238/026
See application file for complete search history.

(56) References Cited

U.S. PATENT DOCUMENTS

2013/0036992 A1* 2/2013 Iwai ............ F01L 9/10
123/90.12
2013/0036993 A1 2/2013 Nakamura
(Continued)

FOREIGN PATENT DOCUMENTS

JP 2013-36395 A 2/2013
JP 2014-118977 A 6/2014
(Continued)

OTHER PUBLICATIONS

International Search Report (PCT/ISA/210), issued in PCT/JP2021/010586, dated Jun. 1, 2021.

*Primary Examiner* — Audrey B. Walter
(74) *Attorney, Agent, or Firm* — Birch, Stewart, Kolasch & Birch, LLP

(57) ABSTRACT

Provided is a valve timing adjustment device that suppresses slippage of an assist spring, prevents disengagement, and facilitates assembly of the assist spring. A valve timing adjustment device adjusts an opening timing and closing timing of an intake valve or an exhaust valve of an internal combustion engine. In the assist spring, the inner peripheral end portion is formed in a non-bent shape, the outermost periphery is in contact with the rib, a second winding is in contact with the inner peripheral end portion, and there is no contact between windings from the second winding to the outermost periphery.

3 Claims, 4 Drawing Sheets

(56) References Cited

U.S. PATENT DOCUMENTS

| | | | |
|---|---|---|---|
| 2013/0327288 A1* | 12/2013 | Boese | F01L 1/344 |
| | | | 123/90.17 |
| 2015/0292585 A1 | 10/2015 | Kishihara et al. | |
| 2017/0096916 A1* | 4/2017 | Boese | F01L 1/3442 |
| 2022/0220869 A1* | 7/2022 | Chikayama | F01L 1/356 |

FOREIGN PATENT DOCUMENTS

| | | | |
|---|---|---|---|
| JP | 2014-152671 A | | 8/2014 |
| JP | 2015059429 A | * | 3/2015 |

* cited by examiner

VALVE TIMING ADJUSTMENT DEVICE AND METHOD FOR MANUFACTURING VALVE TIMING ADJUSTMENT DEVICE

TECHNICAL FIELD

The present disclosure relates to a valve timing adjustment device including a spiral-spring-type assist spring that biases a rotor.

BACKGROUND ART

Conventionally, a variable valve timing adjustment device that controls an opening timing and closing timing of an intake valve or an exhaust valve of an internal combustion engine for an automobile has been devised, and a vane type hydraulic actuator is often adopted. In some variable valve timing adjustment devices, an assist spring that biases a rotor in which a vane is formed in one direction is disposed for the purpose of returning to a reference position or equalizing an operation speed. Various types of the assist spring are conceivable depending on a disposition position and a spring shape, but for example, there is also an example in which a spiral spring is adopted from a viewpoint of a disposition space and a spring constant.

This spring is formed in such a manner that an inner peripheral end thereof is bent toward a center, and is disposed so as to be engaged with an engagement groove formed at an end portion of an extending portion of a boss portion. In addition, the spring is formed in a hook shape in such a manner that an outer peripheral end thereof is bent radially outward and then folded back, and is disposed so as to be engaged with an engagement pin. In addition, in order to be able to suppress omission and positional deviation of the inner peripheral end, the spring is disposed in such a manner that a wire gap between a plurality of specific points of an element wire is substantially zero, that is, in a state where the plurality of specific points is in a slight contact with each other. Note that the engagement groove and the inner peripheral end of the spring are located near the specific points, and the specific points are located near the engagement pin (see, for example, Patent Literature 1).

CITATION LIST

Patent Literature

Patent Literature 1: JP 2013-36395 A

SUMMARY OF INVENTION

Technical Problem

In the conventional valve timing adjustment device described above, the spring is formed in such a manner that an inner peripheral end of the spring is bent toward a center, and is disposed so as to be engaged with an engagement groove formed at an end portion of an extending portion of a boss portion. As a result, there is a problem that the spring slides due to torque fluctuation or engine vibration, and the engagement is released from the engagement groove. In addition, the spring is disposed in a state where a plurality of specific points of an element wire are in a slight contact with each other. Therefore, the spring is engaged with the engagement groove in a state where torque is applied. As a result, there is a problem that a spring assembling property is deteriorated.

The present disclosure has been made in order to solve the above-described problems, and an object of the present disclosure is to obtain a valve timing adjustment device that suppresses slippage of an assist spring, prevents disengagement, and facilitates assembly of the assist spring.

Solution to Problem

A valve timing adjustment device according to the present disclosure includes: a first rotating body that has a bottomed cylindrical shape with a plurality of operating hydraulic chambers therein, a bottom of the bottomed cylindrical shape being penetrated by a distal end of a camshaft, and has an opening closed by a disk-shaped plate; a second rotating body that has a vane that divides each of the operating hydraulic chambers into an advanced angle side and a retarded angle side, is disposed inside the first rotating body, is fixed to the distal end of the camshaft, relatively rotates with respect to the first rotating body, has a substantially columnar shape, forms the vane having a protruding shape on an outer periphery of the substantially columnar shape, and has a through hole forming a two-surface width portion on a central axis of the substantially columnar shape; a holder that is disposed on the axis of the second rotating body outside the plate of the first rotating body, has a substantially cylindrical shape, and is fixed to the second rotating body with a two-surface width formed by two opposing sides of a polygonal shape of an outer peripheral surface of the substantially cylindrical shape; a protrusion-shaped rib disposed outside the plate of the first rotating body and protruding from the first rotating body; and a spiral-spring-type assist spring that is disposed outside the plate of the first rotating body, has an outer peripheral end portion fixed to the first rotating body, has an innermost periphery and an inner peripheral end portion wound around an outer periphery of the holder and fixed to the second rotating body, and biases the second rotating body in one direction with respect to the first rotating body. In the assist spring, the inner peripheral end portion is formed in a non-bent shape, an outer side of an outermost periphery is in contact with the rib, a second winding is in contact with the inner peripheral end portion, and there is no contact between windings from the second winding to the outermost periphery.

Advantageous Effects of Invention

The valve timing adjustment device configured as described above is formed by winding the inner peripheral end portion of the assist spring around the holder in a non-bent shape. In addition, the second winding is in contact with the inner peripheral end portion, and there is no contact between windings from the second winding to the outermost periphery. Therefore, the valve timing adjustment device that suppresses slippage of the assist spring, prevents disengagement, and facilitates assembly of the assist spring can be obtained.

BRIEF DESCRIPTION OF DRAWINGS

FIGS. 5A and 5B are diagrams illustrating a state of the assist spring in the valve timing adjustment device according to the first embodiment at an operation angle, in which FIG. 5A illustrates a state of a most advanced angle position, and FIG. 5B illustrates a state of a most retarded angle position.

DESCRIPTION OF EMBODIMENTS

Hereinafter, in order to describe the present disclosure in more detail, an embodiment for embodying the present disclosure will be described with reference to the attached drawings.

First Example

First Embodiment

Figure 1:
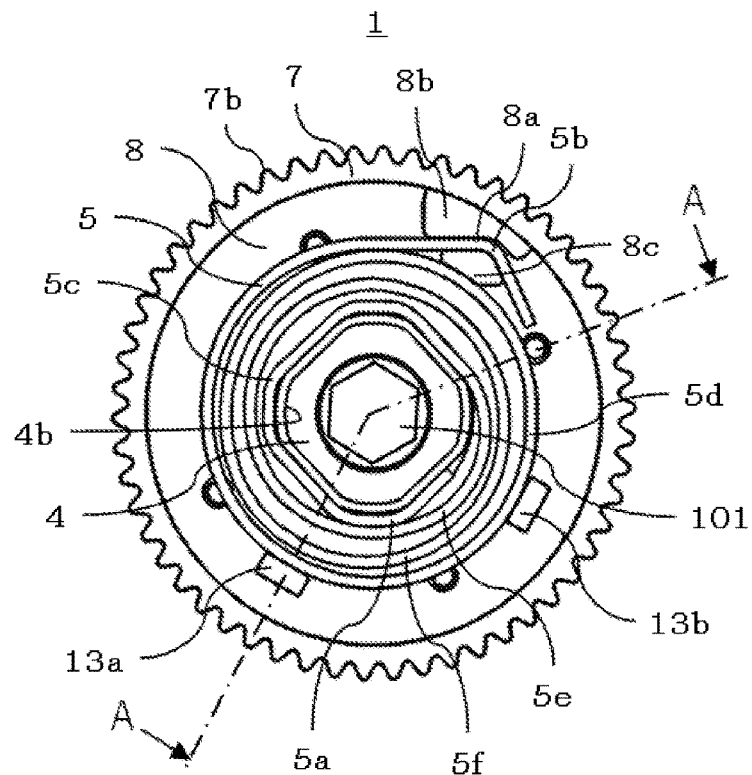
FIG. 1 is a plan view illustrating a configuration example of a valve timing adjustment device according to a first embodiment.
Figure 2:
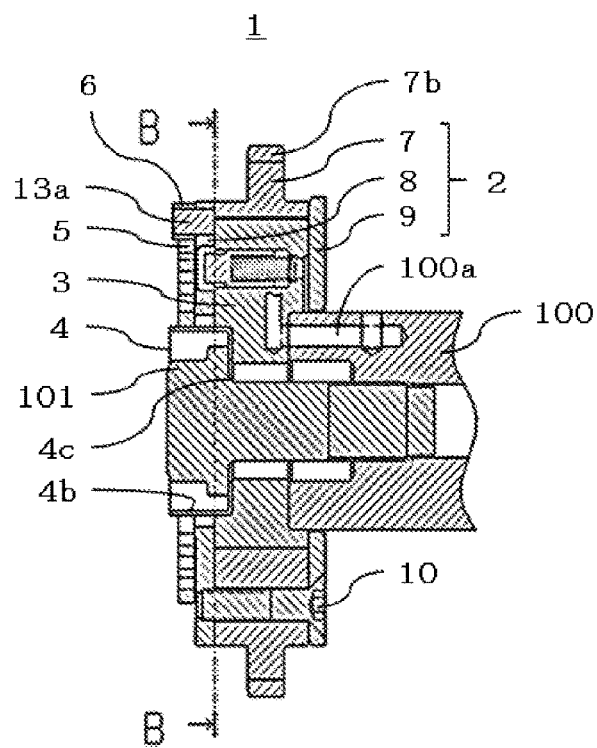
FIG. 2 is a cross-sectional view taken along line AA in FIG. 1.
Figure 3:
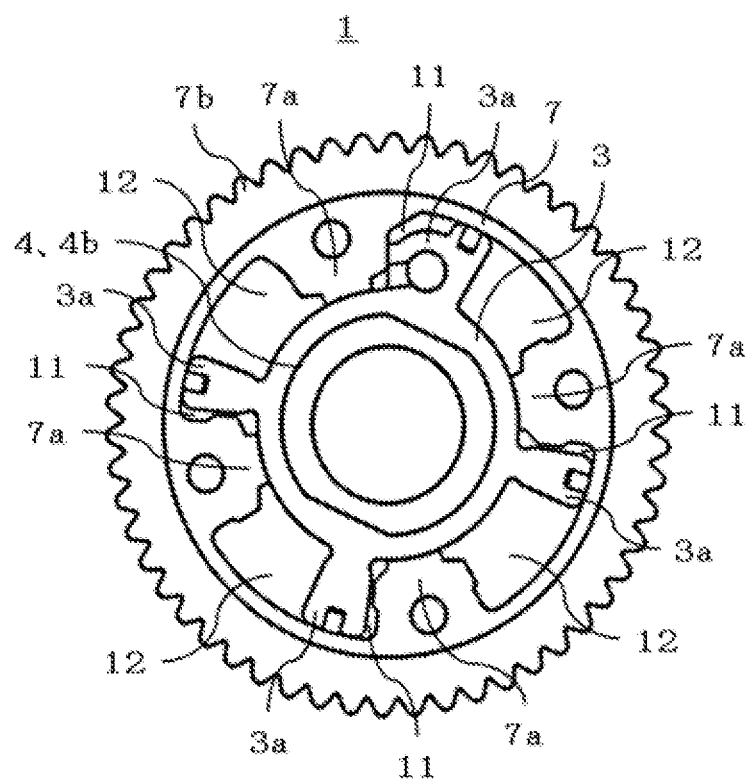
FIG. 3 is a cross-sectional view taken along line BB in FIG. 2.
Figure 4:
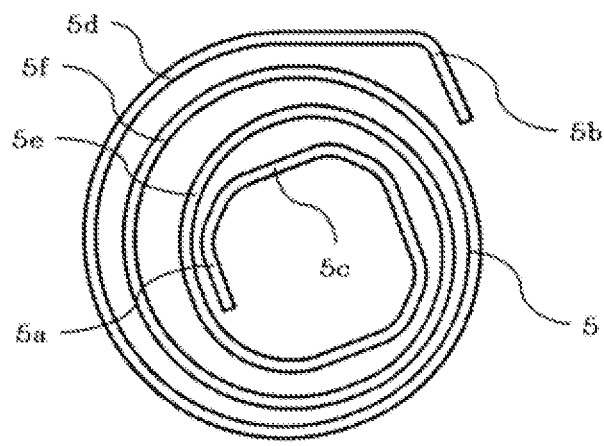
FIG. 4 is a diagram illustrating a state of a free length of an assist spring in the valve timing adjustment device according to the first embodiment.
Figure 5A:
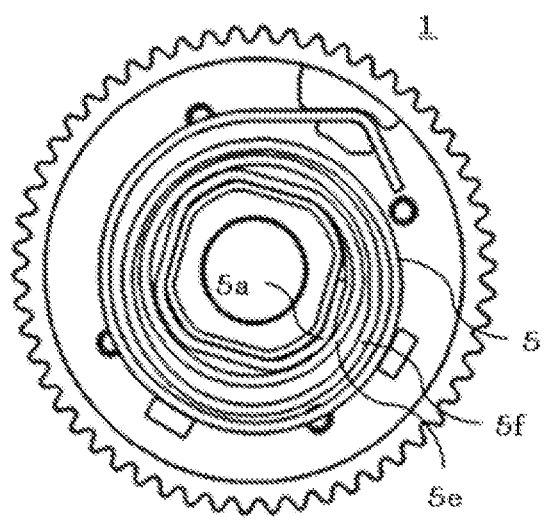
Figure 5B:
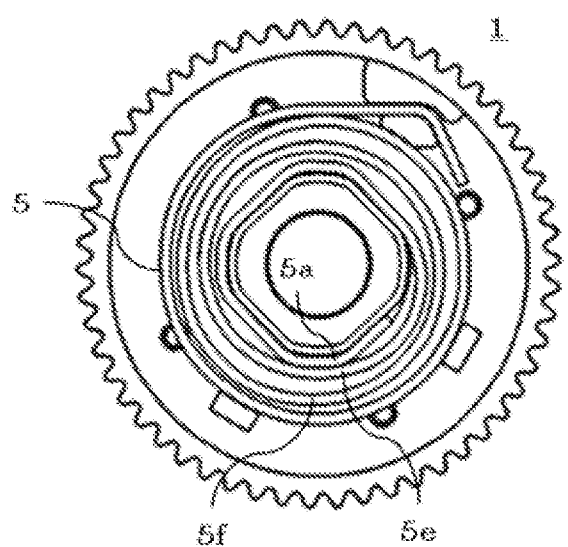
Figure 6:
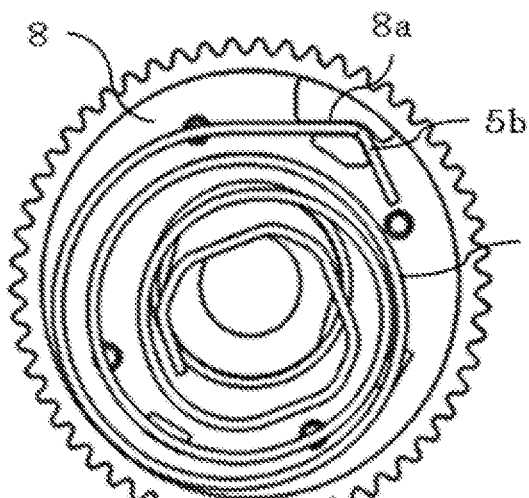
FIGS. 6(1), 6(2), 6(3) and 6(4) are diagrams illustrating a method for assembling the assist spring in the valve timing adjustment device according to the first embodiment, in which FIGS. 6(1) to 6(4) illustrate an assembling procedure.
Figure 6:
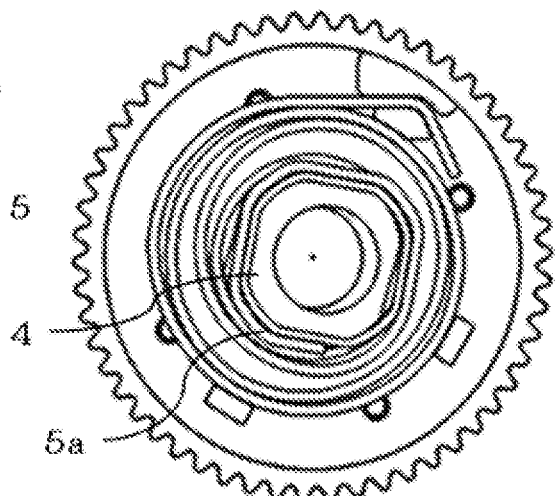
Figure 6:
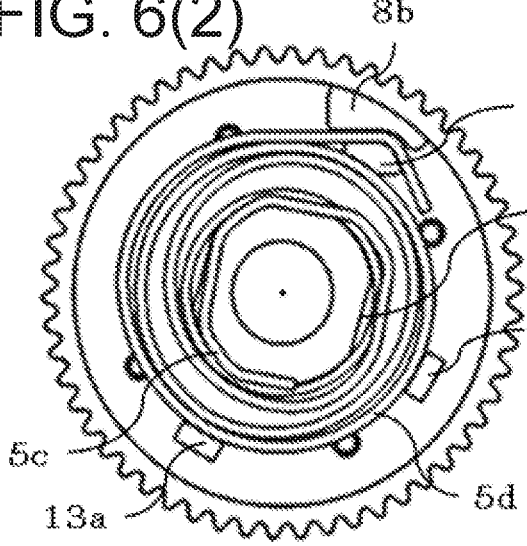
Figure 6:
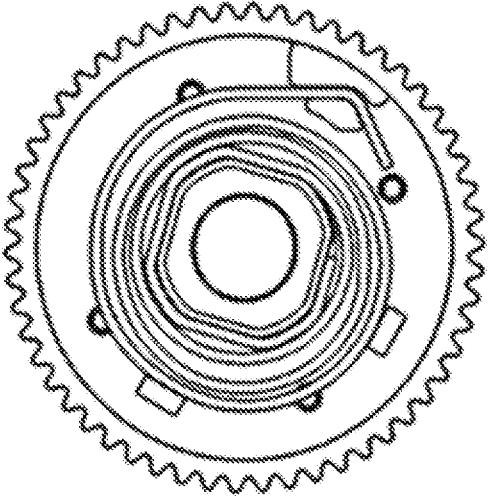

A valve timing adjustment device according to a first embodiment will be described with reference to FIGS. 1 to 6. FIG. 1 is a plan view illustrating a configuration example of the valve timing adjustment device according to the first embodiment. FIG. 2 is a cross-sectional view taken along line AA in FIG. 1. FIG. 3 is a cross-sectional view taken along line BB in FIG. 2. FIG. 4 is a diagram illustrating a state of a free length of an assist spring in the valve timing adjustment device according to the first embodiment. FIG. 5 is a diagram illustrating a state of the assist spring in the valve timing adjustment device according to the first embodiment at an operation angle, in which FIG. 5A illustrates a state of a most advanced angle position, and FIG. 5B illustrates a state of a most retarded angle position. FIG. 6 is a diagram illustrating a method for assembling the assist spring in the valve timing adjustment device according to the first embodiment, in which FIGS. 6(1) to 6(4) illustrate an assembling procedure.

As illustrated in FIGS. 1, 2, and 3, a valve timing adjustment device 1 includes, as a basic structure, a first rotating body having an operating hydraulic chamber, a second rotating body that has a vane 3a that divides the operating hydraulic chamber into an advanced angle hydraulic chamber 11 and a retarded angle hydraulic chamber 12, and relatively rotates with respect to the first rotating body, a spiral-spring-type assist spring 5 that biases the second rotating body in one direction with respect to the first rotating body; a holder 4 that is engaged with an inner peripheral end portion 5a of the assist spring 5 and is fixed to the second rotating body, locking ribs 8b and 8c that are disposed in the first rotating body and lock an outer peripheral end portion 5b of the assist spring 5, and ribs 13a and 13b with which an outer periphery of the assist spring 5 is in contact. Here, the first rotating body is a housing 2, and the housing 2 includes a case 7, a plate 8, and a cover 9. The second rotating body is a rotor 3.

A sprocket portion 7b is formed on an outer surface of the case 7. A chain (not illustrated) is mounted on the sprocket portion 7b, and a driving force of a crankshaft of an internal combustion engine is transmitted to the case 7. This driving force causes the housing 2 to rotate synchronously with the crankshaft. Meanwhile, the rotor 3 and the holder 4 are fastened to a camshaft 100 of the internal combustion engine by a center bolt 101 and rotate synchronously with the camshaft 100.

A hole through which a bolt 10 passes is formed in each of the case 7 and the cover 9, and a female screw to which the bolt 10 is fastened is formed in the plate 8. With the case 7 and the rotor 3 sandwiched between the plate 8 and the cover 9, the case 7, the plate 8, and the cover 9 are coaxially fixed by a plurality of the bolts 10.

A plurality of shoe portions 7a protruding inward is formed on an inner surface of the case 7. A space surrounded by the shoe portions 7a, the plate 8, and the cover 9 is an operating hydraulic chamber. In the configuration example of FIG. 3, there are four operating hydraulic chambers. The rotor 3 is disposed inside the case 7. A plurality of vanes 3a protruding outward is formed on the rotor 3. On a central axis of the rotor 3, a two-surface width portion 3b to which the holder 4 is fitted and fixed is formed on an inner periphery, and a hole being penetrated by the center bolt 101 is drilled. Each of the plurality of vanes 3a is disposed in each of the plurality of operating hydraulic chambers of the case 7. One vane 3a divides one operating hydraulic chamber into the advanced angle hydraulic chamber 11 and the retarded angle hydraulic chamber 12.

By operating oil being supplied to the advanced angle hydraulic chamber 11 or the retarded angle hydraulic chamber 12 via a hydraulic path 100a formed inside the camshaft 100 and the rotor 3, the rotor 3 relatively rotates with respect to the housing 2, and a relative angle of the rotor 3 with respect to the housing 2 is adjusted to an advanced angle side or a retarded angle side. When the relative angle of the rotor 3 with respect to the housing 2 is adjusted, a rotational phase of the camshaft 100 with respect to the crankshaft changes to an advanced angle side or a retarded angle side, and an opening timing and closing timing of an intake valve or an exhaust valve also changes.

The holder 4 has a bottomed cylindrical shape, has an outer peripheral surface formed in a polygonal shape such as a substantially octagonal shape, and has a two-surface width formed by two opposing sides. In the holder 4, a cylindrical portion 4b and a hole 4c are formed by a steel plate being pressed. An innermost periphery 5c, which is the first winding of the assist spring 5, is wound around an outer peripheral surface of the cylindrical portion 4b, and the inner peripheral end portion 5a is engaged therewith. The holder 4 is fastened to the rotor 3 and the camshaft 100 by the center bolt 101 inserted into the hole 4c.

The assist spring 5 biases the rotor 3 toward an advanced angle side with respect to the housing 2 in order to oppose a reaction force that the camshaft 100 receives from the intake valve or the exhaust valve. The assist spring 5 is a spiral spring in which a square wire is horizontally wound, and is fixed to the rotor 3 by the holder 4 and is fixed to the plate 8 of the housing 2 by the locking ribs 8b and 8c. The inner peripheral end portion 5a of the assist spring 5 is formed in a non-bent shape, while the outer peripheral end portion 5b is formed in a bent shape. Note that the outer peripheral end portion 5b may have a hook shape or the like. The innermost periphery 5c, which is the first winding of the assist spring 5, is wound around an outer peripheral surface of the cylindrical portion 4b. By the inner peripheral end portion 5a of the assist spring 5 being engaged with the outer peripheral surface of the cylindrical portion 4b, the inner peripheral end portion 5a of the assist spring 5 is fixed to the holder 4 and connected to the rotor 3. By the outer peripheral end portion 5b of the assist spring 5 being engaged with a groove 8a formed by the locking ribs 8b and 8c arranged on the plate 8, the outer peripheral end portion 5b of the assist spring 5 is fixed to the plate 8.

An outer peripheral side of an outermost periphery 5d of the assist spring 5 is in contact with the ribs 13a and 13b, and release of the assist spring 5 is restricted. A second winding 5e of the assist spring 5 is in contact with the inner peripheral end portion 5a, and the assist spring 5 biases the inner peripheral end portion 5a toward the holder 4. In addition, a third winding 5f and the second winding 5e are not in contact with each other, and for example, in the configuration example of FIG. 1, the third winding 5f and the second winding 5e are not in contact with each other near the inner peripheral end portion 5a. The third winding 5f of the assist spring 5 is excluded from the biasing of the inner peripheral end portion 5a toward the holder 4. In addition, similarly, there is no contact between windings from the third winding 5f to the outermost periphery 5d. Note that, in the configuration example of FIG. 1, the number of windings of the assist spring 5 is four, but the number of windings is not limited to that of the configuration example.

The locking ribs 8b and 8c are protrusions that are projected on the assist spring 5 side of the plate 8 so as to face each other and form the groove 8a. The locking ribs 8b and 8c are formed upright by press-fitting into holes drilled in the plate 8, formed by attachment with bolts (not illustrated), or formed by processing the plate 8, for example. The outer peripheral end portion 5b of the assist spring 5 is engaged with the groove 8a formed by the locking ribs 8b and 8c.

The ribs 13a and 13b are protrusions projected on the assist spring 5 side of the plate 8. The ribs 13a and 13b are formed upright by press-fitting into holes drilled in the plate 8, formed by attachment with bolts (not illustrated), or formed by processing the plate 8, for example. The number of the ribs 13a and 13b to be disposed is at least one. An outer peripheral side of the outermost periphery 5d of the assist spring 5 is in contact with the ribs 13a and 13b, and release of the assist spring 5 is restricted. Note that, in the configuration example of FIG. 1, the two ribs 13a and 13b are disposed at two positions on an outer peripheral portion of the plate 8, but the number and disposition positions of the ribs 13a and 13b are not limited to those of the configuration example of FIG. 1.

As illustrated in FIG. 4, in the assist spring 5, element wires are not in contact with each other in a free length state. That is, all the element wires including the inner peripheral end portion 5a, the innermost periphery (first winding) 5c, the second winding 5e, the third winding 5f, and the outer peripheral end portion 5b of the outermost periphery 5d are formed so as to have a gap therebetween. Note that, in the configuration example of FIG. 4, the number of windings of the assist spring 5 is four, but the number of windings is not limited to that of the configuration example. The assist spring 5 has been subjected to shot peening. The shot peening improves fatigue strength resistance due to processing hardening.

As illustrated in FIG. 5, the valve timing adjustment device 1 is used within an operation angle range between a most advanced angle position and a most retarded angle position. Within the operation angle range of the valve timing adjustment device 1, the second winding 5e of the assist spring 5 is in contact with the inner peripheral end portion 5a, and the assist spring 5 biases the inner peripheral end portion 5a toward the holder 4. In addition, the third winding 5f and the second winding 5e are not in contact with each other, and the third winding 5f of the assist spring 5 is excluded from the biasing of the inner peripheral end portion 5a toward the holder 4. In addition, similarly, there is no contact between windings from the third winding 5f to the outermost periphery 5d. Note that, in the configuration example of FIG. 5, the number of windings of the assist spring 5 is four, but the number of windings is not limited to that of the configuration example.

Next, an operation of the valve timing adjustment device configured as described above will be described with reference to FIGS. 1 to 5.

As illustrated in FIGS. 1, 2, and 3, a driving force of a crankshaft of an internal combustion engine is transmitted to the case 7 by a chain (not illustrated). This driving force causes the housing 2 to rotate synchronously with the crankshaft. Meanwhile, the rotor 3 and the holder 4 rotate synchronously with the camshaft 100. By operating oil being supplied to the advanced angle hydraulic chamber 11 or the retarded angle hydraulic chamber 12, the rotor 3 relatively rotates with respect to the housing 2, and a relative angle of the rotor 3 with respect to the housing 2 is adjusted to an advanced angle side or a retarded angle side. Then, a rotational phase of the camshaft 100 with respect to the crankshaft changes to an advanced angle side or a retarded angle side, and an opening timing and closing timing of an intake valve or an exhaust valve also changes. In this state, the rotor 3 is biased toward an advanced angle side with respect to the housing 2 by the assist spring 5 in order to oppose a reaction force that the camshaft 100 receives from the intake valve or the exhaust valve.

As illustrated in FIGS. 1 and 5, the inner peripheral end portion 5a of the assist spring 5 has a non-bent shape, and the innermost periphery (first winding) 5c is wound around and engaged with an outer peripheral surface of the cylindrical portion 4b. Within the operation angle range, the second winding 5e of the assist spring 5 is in contact with the inner peripheral end portion 5a, and the inner peripheral end portion 5a is biased toward the holder 4. As a result, slippage between the assist spring 5 and the holder 4 due to torque fluctuation or engine vibration is suppressed. As a result, disengagement of the assist spring 5 is prevented.

In addition, within the operation angle range, the third winding 5f of the assist spring 5 and the second winding 5e thereof are not in contact with each other, and the third winding 5f is excluded from the biasing of the inner peripheral end portion 5a toward the holder 4. In addition, similarly, there is no contact between windings from the third winding 5f to the outermost periphery 5d. Therefore, hysteresis due to contact between element wires of the assist spring 5 is suppressed.

In addition, an outer peripheral side of the outermost periphery 5d of the assist spring 5 is in contact with the ribs 13a and 13b, and release of the assist spring 5 is restricted. Therefore, resonance of the assist spring 5 due to engine vibration is suppressed.

As illustrated in FIG. 4, in the assist spring 5, element wires are not in contact with each other in a free length state. That is, since there is a gap between the element wires, shot peening is performed on the entire surface.

Next, a method for manufacturing a valve timing adjustment device related to assembly of the assist spring 5 of the valve timing adjustment device configured as described above will be described with reference to FIG. 6.

As illustrated in FIG. 6(1), in a first step, the outer peripheral end portion 5b of the assist spring 5 is fitted to the groove 8a and engaged with and fixed to the locking ribs 8b and 8c.

As illustrated in FIG. 6(2), in a second step, the innermost periphery 5c of the assist spring 5 is rotated, the diameter of the outermost periphery 5*d* is reduced, and the outermost periphery 5*d* is fitted to inner peripheral sides of the ribs 13*a* and 13*b*.

As illustrated in FIG. 6(3), in a third step, the holder 4 is rotated, and the position of the shape of the innermost periphery 5*c* of the assist spring 5 and the position of the shape of the outer periphery of the holder 4 are matched, that is, are matched to a position in a state of being wound. Thereafter, the innermost periphery 5*c* is fitted to the outer periphery of the holder 4, and the inner peripheral end portion 5*a* is engaged with the outer periphery of the holder 4.

As illustrated in FIG. 6(4), in a fourth step, the holder 4 is twisted and rotated, and the position of the two-surface width formed by two sides of the outer periphery of the holder 4 and the position of the two-surface width portion 3*b* formed on an inner periphery of the rotor 3 are matched. Thereafter, the holder 4 is fitted to the two-surface width portion 3*b*, and the holder 4 is fixed. That is, the inner peripheral end portion 5*a* of the assist spring 5 is fixed to the rotor 3, and the assist spring 5 of the valve timing adjustment device 1 is assembled, thus manufacturing the valve timing adjustment device.

As described above, in the valve timing adjustment device described in the first embodiment, the inner peripheral end portion 5*a* of the assist spring 5 is formed in a non-bent shape, and the innermost periphery (first winding) 5*c* is wound around and engaged with the outer peripheral surface of the cylindrical portion 4*b*. Then, the second winding 5*e* is in contact with the inner peripheral end portion 5*a*, and the inner peripheral end portion 5*a* is biased toward the holder 4. As a result, it is possible to suppress slippage between the assist spring 5 and the holder 4 due to torque fluctuation or engine vibration, and as a result, it is possible to prevent disengagement of the assist spring 5.

In addition, the third winding 5*f* of the assist spring 5 and the second winding 5*e* thereof are not in contact with each other. In addition, similarly, there is no contact between windings from the third winding 5*f* to the outermost periphery 5*d*. As a result, the assist spring 5 can be assembled by applying a low torque, and the assembly of the assist spring 5 is facilitated.

Furthermore, the third winding 5*f* of the assist spring 5 and the second winding 5*e* thereof are not in contact with each other. In addition, similarly, there is no contact between windings from the third winding 5*f* to the outermost periphery 5*d*. Therefore, hysteresis due to contact between element wires of the assist spring 5 is suppressed.

In addition, an outer peripheral side of the outermost periphery 5*d* of the assist spring 5 is in contact with the ribs 13*a* and 13*b*. Therefore, resonance of the assist spring 5 due to engine vibration is suppressed.

In addition, in the assist spring 5, element wires are not in contact with each other in a free length state, and therefore there is a gap between the element wires. As a result, shot peening can be performed on the entire surface, and as a result, fatigue strength resistance is improved.

By the way, the valve timing adjustment device 1 described in the above embodiment may be used on either an intake side or an exhaust side. In addition, a biasing direction of the assist spring 5 may be either an advanced angle side or a retarded angle side.

In addition, since the structure of the assist spring 5 of the first embodiment does not affect the internal structure of the valve timing adjustment device 1, it goes without saying that the structure of the assist spring 5 of the first embodiment can be applied to a device other than the valve timing adjustment device 1 having the illustrated internal structure.

Note that the present disclosure can modify any constituent element in the embodiment, or omit any constituent element in the embodiment within the scope of the disclosure.

INDUSTRIAL APPLICABILITY

The valve timing adjustment device according to the present disclosure can be used for a valve timing adjustment device that adjusts an opening timing and closing timing of an intake valve or an exhaust valve of an internal combustion engine, and the like.

REFERENCE SIGNS LIST

1: valve timing adjustment device, 2: housing (first rotating body), 3: rotor (second rotating body), 3*a*: vane, 3*b*: two-surface width portion, 4: holder, 4*b*: cylindrical portion, 4*c*: hole, 5: assist spring, 5*a*: inner peripheral end portion, 5*b*: outer peripheral end portion, 5*c*: innermost periphery (first winding), 5*d*: outermost periphery, 5*e*: second winding, 5*f*: third winding, 7: case (first rotating body), 7*a*: shoe portion, 7*b*: sprocket portion, 8: plate (first rotating body), 8*a*: groove, 8*b*, 8*c*: locking rib, 9: cover (first rotating body), 10: bolt, 11: advanced angle hydraulic chamber, 12: retarded angle hydraulic chamber, 13*a*, 13*b*: rib, 100: camshaft, 100*a*: hydraulic path, 101: center bolt

The invention claimed is:

1. A valve timing adjustment device comprising:
a first rotating body that has a bottomed cylindrical shape with a plurality of operating hydraulic chambers inside, a bottom of the bottomed cylindrical shape being penetrated by a distal end of a camshaft, and has an opening closed by a disk-shaped plate;
a second rotating body that has a vane that divides each of the operating hydraulic chambers into an advanced angle side and a retarded angle side, is disposed inside the first rotating body, is fixed to the distal end of the camshaft, relatively rotates with respect to the first rotating body, has a substantially columnar shape, forms the vane having a protruding shape on an outer periphery of the substantially columnar shape, and has a through hole forming a two-surface width portion on a central axis of the substantially columnar shape;
a holder that is disposed on the axis of the second rotating body outside the plate of the first rotating body, has a substantially cylindrical shape, and is fixed to the second rotating body with a two-surface width formed by two opposing sides of a polygonal shape of an outer peripheral surface of the substantially cylindrical shape;
a protrusion-shaped rib disposed outside the plate of the first rotating body and protruding from the first rotating body; and
a spiral assist spring that is disposed outside the plate of the first rotating body, has an outer peripheral end portion fixed to the first rotating body, has an innermost periphery and an inner peripheral end portion wound around an outer periphery of the holder and fixed to the second rotating body, and biases the second rotating body in one direction with respect to the first rotating body, wherein
in the assist spring, the inner peripheral end portion is formed in a non-bent shape, an outer side of an outermost periphery is in contact with the rib, a second winding is in contact with the inner peripheral end portion, and there is no contact between windings from the second winding to the outermost periphery.

2. The valve timing adjustment device according to claim 1, wherein the second winding and the inner peripheral end portion are in contact with each other within an operation angle range in which the relative rotation is performed.

3. A method for manufacturing a valve timing adjustment device according to claim 1, the method comprising assembling the assist spring by fixing the outer peripheral end portion to the first rotating body, rotating the innermost periphery, reducing a diameter of the outermost periphery, and fitting the outermost periphery to an inner peripheral side of the rib, rotating the holder, matching a position of a shape of the outer periphery of the holder and a position of a shape of the innermost periphery, fitting the innermost periphery to the outer periphery of the holder, and engaging the inner peripheral end portion with the holder, and rotating the holder and fitting the two-surface width of the holder to the two-surface width portion of the second rotating body.

\* \* \* \* \*